Nov. 4, 1952  C. W. METZGAR  2,616,771
BEARING
Filed Dec. 9, 1947
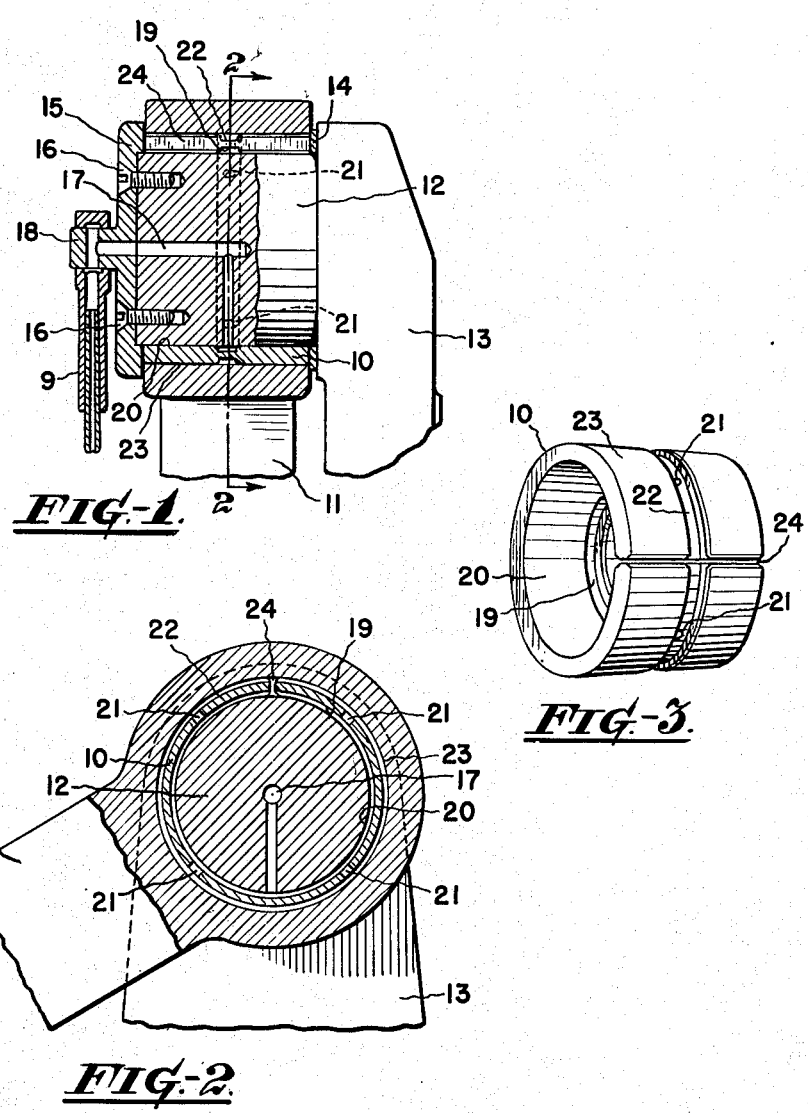
INVENTOR
CHESTER W. METZGAR
BY
HIS ATTORNEY.

Patented Nov. 4, 1952

2,616,771

UNITED STATES PATENT OFFICE 2,616,771

BEARING

Chester W. Metzgar, Easton, Pa., assignor to Ingersoll-Rand Company, New York, N. Y., a corporation of New Jersey Application December 9, 1947, Serial No. 790,540

1 Claim. (Cl. 308—240)

This invention relates to bearings, and more particularly to a split aluminum alloy bearing for a rotary member.

Experimentation has shown that aluminum bearings have a desirable characteristic in not damaging a bearing surface of a connecting rod or a journal, to which it is adapted, by seizure of the bearing therewith. However, it has also been found that solid aluminum alloy bearings expand rapidly whenever subjected to an increase in temperature and, therefore, have a tendency to seize with the connecting rod.

One object of my invention is to utilize the desirable characteristics normally attendant in the use of aluminum alloy bearings and to also use its thermo-expansion characteristic to advantage in maintaining a proper fit between the bearing and the member to which it is adapted under varying thermal conditions.

Another object is to construct a bearing which insures adequate lubrication over the entire bearing surface.

Another object is to prevent possible damage of the member to which the bearing is adapted by seizure therebetween.

A further object is to provide a bearing that may be easily removed from the journal.

Other objects will be in part obvious and in part pointed out hereinafter.

In the drawings accompanying this specification and in which similar reference numerals refer to similar parts, Figure 1 is a longitudinal view, partly in section, of the bearing constructed in accordance with the practice of the invention and shown adapted to a crank shaft, Figure 2 is a transverse view taken through Figure 1 on the line 2—2, and Figure 3 is a view in perspective of the bearing.

Referring more particularly to the drawings, a bearing 10, constructed in accordance with the practice of the invention, is shown adapted to a connecting rod 11 and carried by a crank shaft comprising a pin 12 and a crank arm 13. Longitudinal motion of the bearing is restricted in one direction by a ring 14 which encircles the pin 12 and bears against the crank arm, and in the opposite direction by a cap 15 which is held against the free end of the pin by screws 16.

Lubricant is supplied to the bearing through a channel 17 in the pin 12 by means of a pump 9, disclosed in my United States Patent No. 2,194,710, granted March 26, 1940, the end portion of which is adapted to a projection 18 on the cap 15. The lubricating fluid is conveyed from the channel 17 around the periphery of the pin by a circumferential groove 19 formed in an inner bearing surface 20 of the bearing 10 and the edges of the groove are beveled to assure longitudinal flow of the lubricant therefrom onto the surface 20.

Oil passes from the groove 19 through ports 21 in the bearing to a similar groove 22 in an outer bearing surface 23 on the bearing 10. To insure further that proper lubrication is maintained across the entire width of the bearing and to allow for thermal expansion thereof, the bearing is split by a longitudinal cut 24 and the junctures of the surfaces defining the cut and the bearing surfaces are beveled to allow lubricant to flow more freely from the cut onto the bearing surfaces and to prevent any wiping action thereby.

In practice, a bearing constructed of an alloy comprising 6% tin, 1% copper and 1% nickel, and 92% aluminum has given satisfactory results. However, it is to be understood that this combination is not restrictive and that these percentages can be varied to a limited extent in either direction, as for example a satisfactory bearing was constructed in which the percentages of tin and copper were 8% and 5%, respectively.

The bearing is, moreover, designed to have a close fit with the journal or pin and a loose fit with the connecting rod, at room temperatures. As the temperature increases the bearing expands radially until a predetermined spaced relation exists between the bearing surfaces 23 and 20 and the connecting rod and the pin, respectively. Oil can then readily flow from the grooves 19 and 22 and the longitudinal cut 24 to the bearing surfaces 20 and 23 for lubricating them and thereby assure freedom of movement of the bearing rotatively so that it can change its position and in that way prevent excessive wear to any particular area on the bearing.

Further radial expansion of the bearing is opposed by the oil pressure between the bearing and the connecting rod and expansion of the bearing occurring thereafter is taken up by a reduction in width of the longitudinal cut, and therefore a substantially constant space relation can be maintained through a wide range of temperatures.

In the event of seizure of the connecting rod by the bearing, as may occur under extreme temperature condition, the bearing can be slid easily from the journal by merely removing the cap 15 and relieving the pressure on the bearing. Experiments have revealed that the mere cleaning of the bearing usually renders it satisfactory for further service.

I claim:

A bearing comprising an aluminum alloy member having inner and outer cylindrical bearing surfaces and a longitudinal cut through said member, a continuous circumferential groove in each of the surfaces terminating at the longitudinal cut for conveying lubricating oil about the circumference and to the longitudinal cut of the aluminum alloy member, beveled surfaces on the alloy member joining the cylindrical bearing surfaces with the circumferential grooves to permit the flow of lubricant from the grooves onto the bearing surfaces, beveled surfaces on the alloy member joining the cylindrical bearing surfaces and the longitudinal cut to permit the flow of lubricant from the cut onto the bearing surfaces, and holes in the said alloy member joining the inner and outer circumferential grooves to permit the passage of lubricant from one groove to the other.

CHESTER W. METZGAR.

REFERENCES CITED

The following references are of record in the file of this patent:

UNITED STATES PATENTS

| Number | Name | Date |
| --- | --- | --- |
| 127,661 | Upton | June 4, 1872 |
| 1,145,238 | Frick | July 6, 1915 |
| 1,674,453 | Sloper | June 19, 1928 |
| 1,930,655 | Muchnic | Oct. 17, 1933 |
| 2,106,860 | Tibbetts | Feb. 1, 1938 |
| 2,426,940 | McCullough | Sept. 2, 1947 |